United States Patent
Reinhart et al.

(10) Patent No.: US 9,597,958 B2
(45) Date of Patent: Mar. 21, 2017

(54) POWER TAKE-OFF OIL SYSTEM PROVIDING SUMP DRAIN AND PRESSURIZED OIL TO DISCONNECT CLUTCH

(71) Applicant: GM Global Technology Operations LLC, Detroit, MI (US)

(72) Inventors: Timothy J. Reinhart, Lake Orion, MI (US); Addison T. Solak, Ypsilanti, MI (US); Chi Teck Lee, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 66 days.

(21) Appl. No.: 14/823,549

(22) Filed: Aug. 11, 2015

(65) Prior Publication Data

US 2017/0043661 A1    Feb. 16, 2017

(51) Int. Cl.
*B60K 17/28* (2006.01)
*F16H 1/02* (2006.01)
*F16H 57/04* (2010.01)

(52) U.S. Cl.
CPC ............. *B60K 17/28* (2013.01); *F16H 1/02* (2013.01); *F16H 57/0424* (2013.01); *F16H 57/0435* (2013.01)

(58) Field of Classification Search
CPC ....... B60K 17/28; F16H 1/02; F16H 57/0424; F16H 57/0435
See application file for complete search history.

(56) References Cited

U.S. PATENT DOCUMENTS

| | | | |
|---|---|---|---|
| 6,199,653 B1 * | 3/2001 | Matsufuji | B60K 17/35 180/233 |
| 6,450,309 B1 * | 9/2002 | Hirai | B60K 23/02 192/3.63 |
| 2015/0057123 A1 * | 2/2015 | Phelps | F16D 13/74 475/160 |

* cited by examiner

*Primary Examiner* — Faye M Fleming

(57) ABSTRACT

A power take-off (PTO) system for a motor vehicle includes a PTO housing. The PTO housing is mounted to a transmission case. A disconnect clutch assembly is positioned within the PTO housing acting when supplied with a first volume of a pressurized oil from the transmission case to engage an output shaft member. A controlled lube oil circuit is isolated from the first volume of the pressurized oil. The controlled lube oil circuit supplies a second volume of the pressurized oil directly to the disconnect clutch assembly to lubricate the disconnect clutch assembly. A lube oil drain return is connected to the PTO housing. The lube oil drain return receives oil that collects inside the PTO housing to be returned to the transmission case.

20 Claims, 5 Drawing Sheets

POWER TAKE-OFF OIL SYSTEM PROVIDING SUMP DRAIN AND PRESSURIZED OIL TO DISCONNECT CLUTCH

FIELD

The present disclosure relates to vehicular powertrains and more particularly to transmissions having a power take-off output system.

BACKGROUND

The statements in this section merely provide background information related to the present disclosure and may or may not constitute prior art.

Most types of transmissions include an input shaft, an output shaft, a plurality of gear arrangements, interconnecting members, shafts, and torque transmitting mechanisms among other mechanical members. The various torque transmitting mechanisms are employed to selectively transmit torque from one rotating member to another or from a rotating member to a stationary member to achieve a specific speed ratio between the input and output shafts. The output shaft drives a final drive assembly which may have a further speed ratio change between the transmission output shaft and the axle.

When the need for a power take-off (PTO) assembly or other type of equipment requiring torque for operation arises, power for operation of many common PTO devices is commonly either turbine driven or engine driven. If the PTO is turbine driven, the PTO is driven when the transmission is engaged with a predetermined clutch, or after the torque converter is doing work. If the PTO is engine driven, it is coupled to an input shaft or torque converter hub that is always available when the engine is running and is therefore not limited to a transmission mode. A PTO housing containing the PTO rotating and output connection elements can be connected to the transmission. Lubrication oil must be provided for the rotating elements in the PTO housing.

Known PTO systems are supplied with lubricating oil from a lubrication oil system of the transmission, and retain the lubricating oil for the rotating elements in the PTO housing, with only a "limited return" of the oil to a transmission sump. Oil in the PTO system must essentially fill up most of the PTO housing before it reaches a level required to drain back to the transmission. This results in spin losses and reduced efficiency during PTO component operation as well as during periods when PTO components are not engaged, because the rotating elements of the PTO unit are in continuous rotating contact with the lubricating oil. Known PTO systems also do not provide positive pressurized oil flow to the disconnect clutch, but only provide oil as an oil reservoir.

There is therefore a need for a PTO unit which reduces spin loss and improves efficiency over known PTO units which provide only limited return of lubricating oil to the transmission sump after oil fills to a predetermined height in the unit, and a further need for a PTO unit that provides positive pressure oil flow for lubrication of a disconnect clutch.

SUMMARY

The present invention provides a power take-off (PTO) system for a motor vehicle, including a PTO housing; and a transmission case having the PTO pump and the PTO housing mounted to the transmission case. A disconnect clutch assembly positioned in the PTO housing. A lube oil drain return is connected to the PTO housing at a sump created at a housing low point. The lube oil drain return receives oil that collects in the sump below the disconnect clutch assembly to be returned by gravity flow to the transmission case.

In another example of the present invention, a PTO drive shaft is positioned within the PTO housing. The PTO drive shaft is connected to and is axially rotated by a PTO input drive member positioned within the transmission case, and the disconnect clutch assembly is connected to the PTO drive shaft.

In yet another example of the present invention, a pressurized engagement line selectively supplies a first portion of a pressurized oil volume to an apply piston thereby displacing the apply piston to engage a plurality of friction plates of the disconnect clutch assembly, and a controlled lube oil circuit isolated from the pressurized engagement line supplies a second portion of the pressurized oil volume directly to the friction plates and the disconnect clutch assembly to continuously lubricate the friction plates and the disconnect clutch assembly.

In yet another example of the present invention, a separator tube extending longitudinally within an elongated bore created in the PTO drive shaft, the separator tube defining and separating a clutch feed chamber and a control lube oil chamber, wherein: the clutch feed chamber is connected to the pressurized engagement line acting to supply the pressurized oil from the pressurized engagement line to the apply piston; and the control lube oil chamber is connected to the controlled lube oil circuit.

In yet another example of the present invention, a controlled lube oil circuit supplies a pressurized oil volume directly to the disconnect clutch assembly to continuously lubricate the disconnect clutch assembly.

In yet another example of the present invention, a PTO drive shaft is positioned within the PTO housing, the PTO drive shaft having a longitudinal running bore; and a separator tube is longitudinally disposed in the longitudinal running bore separating pressurized oil in a clutch feed chamber from pressurized oil in a control lube oil chamber.

In yet another example of the present invention, a pressurized engagement line supplies the pressurized oil in the clutch feed chamber from a first portion of a volume of pressurized oil of the transmission case; and a controlled lube oil circuit supplies the pressurized oil in the control lube oil chamber from a second portion of the volume of pressurized oil of the transmission case.

In yet another example of the present invention, an output shaft member is rotatably connected to the PTO drive shaft; and a lube oil delivery passage is created in the output shaft member, the lube oil delivery passage in fluid communication with the control lube oil chamber.

In yet another example of the present invention, the output shaft member further includes multiple feed lube apertures in fluid communication with the lube oil delivery passage and opening at the disconnect clutch assembly to provide a continuous flow of pressurized oil to the disconnect clutch assembly.

In yet another example of the present invention, the output shaft member further includes a drive end having gear teeth for meshing with an output member.

In yet another example of the present invention, at least a portion of the lube oil drain return is positioned external to both the PTO housing and the transmission case.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
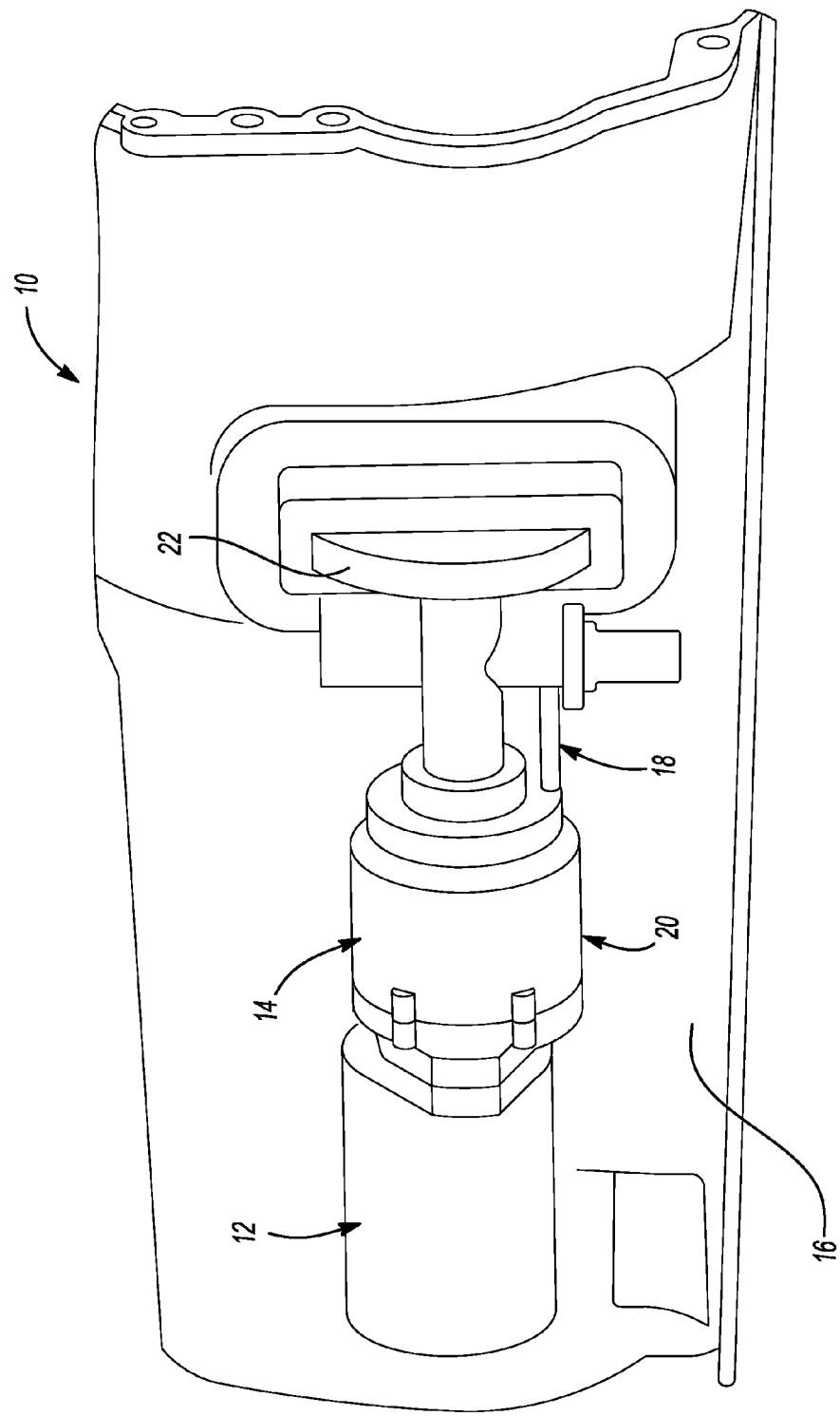
FIG. 1 is a side elevational view of a transmission having a power take-off (PTO) system of the present disclosure.

The following description is merely exemplary in nature and is not intended to limit the present disclosure, application, or uses.

Referring now to the drawings, a power take-off oil system providing sump drain and pressurized oil to a disconnect clutch embodying the principles of the present disclosure is illustrated in FIGS. 1 through 6 and designated PTO system 10.

Referring specifically to FIG. 1, the PTO system 10 includes a PTO pump 12 connected for example by fasteners to a PTO housing 14. The PTO pump 12 and the PTO housing 14 are collectively mounted to a transmission case 16 of an exemplary transmission. Lubricating oil that collects inside the PTO housing 14 is returned by gravity flow to the transmission case 16 via a lube oil drain return 18. The lube oil drain return 18 is connected to the PTO housing 14 at a housing low point 20 shown in greater detail in reference to FIG. 2. According to several aspects, to allow for gravity flow of the lubricating oil within the lube oil drain return 18, at least a portion of the lube oil drain return 18 may be positioned external to both the PTO housing 14 and the transmission case 16, and at least a portion is pitched downwardly toward the transmission case 16. A drive and PTO mounting connection between the PTO system 10 and the transmission case 16 is provided with a PTO input drive cover 22, which seals the transmission case 16 and the PTO system 10 against loss of lubricating oil and influx of external contaminants.

Referring to FIG. 2 and again to FIG. 1, the PTO input drive cover 22 houses a portion of a PTO input drive member 24 which is included with the drive components in the transmission case 16. The PTO input drive member 24 is connected to and axially rotates a PTO drive shaft 26. In order to selectively transfer the drive power provided by the PTO drive shaft 26 to an attachment, such as via an output member 80 shown and described in reference to FIG. 3, which is selected by a user, the PTO system 10 provides a disconnect clutch assembly 28, which may include multiple rotating friction clutches of known design. The attachment selected by the user may be releasably connected to an attachment output 30 which is co-axially rotated together with the PTO drive shaft 26 when the clutches of the disconnect clutch assembly 28 are coupled or engaged.

According to several aspects, the transmission defines a source or volume 31 of a pressurized oil (or transmission fluid) which is available for both operation and lubrication of the PTO system 10. The clutches of the disconnect clutch assembly 28 can be engaged or disengaged by application or removal of pressurized oil supplied through a pressurized engagement line 32 using a first portion 31A of the pressurized oil volume 31 provided by the transmission. Pressurized lube oil is directed from the pressurized engagement line 32 to one or more apply pistons 54 which translate (to the right as viewed in FIG. 2) toward the clutches of the disconnect clutch assembly 28, thereby frictionally engaging the clutches. The clutches rotate together with the PTO drive shaft 26 and when frictionally engaged also co-rotate an output shaft member 34 which is rotatably connected to the PTO drive shaft 26. To frictionally disengage the clutches, pressure in the pressurized engagement line 32 is reduced or bled off, and biasing members contacting the apply pistons 54 apply a biasing force acting opposite to the applied direction of the pressurized oil, thereby stopping rotation of the output shaft member 34.

Oil which is directed to the disconnect clutch assembly 28 for operation of the clutches then drops downwardly and is collected in a low point sump 36. According to several aspects, from the low point sump 36, the collected oil is allowed to drain by gravity flow via a lube oil drain line 38 which forms a portion of the lube oil drain return 18 discussed in reference to FIG. 1, to be returned back to the transmission.

According to further aspects, a second portion 31B of the pressurized oil volume 31 is transferred by a controlled lube oil circuit 40 independently of the pressurized engagement line 32, by a central passage extending through the PTO drive shaft 26 into a lube oil delivery passage 42 created in the output shaft member 34. From the lube oil delivery passage 42 the pressurized lube oil is forced through a plurality of feed lube apertures 44 extending through the output shaft member 34 and outwardly from the lube oil delivery passage 42 to be delivered to the clutches of the disconnect clutch assembly 28 thereby providing a positive oil pressure to lubricate the clutches. After use, the oil drops downwardly and is collected in the low point sump 36 for return by the lube oil drain line 38 to the transmission.

Figure 2:
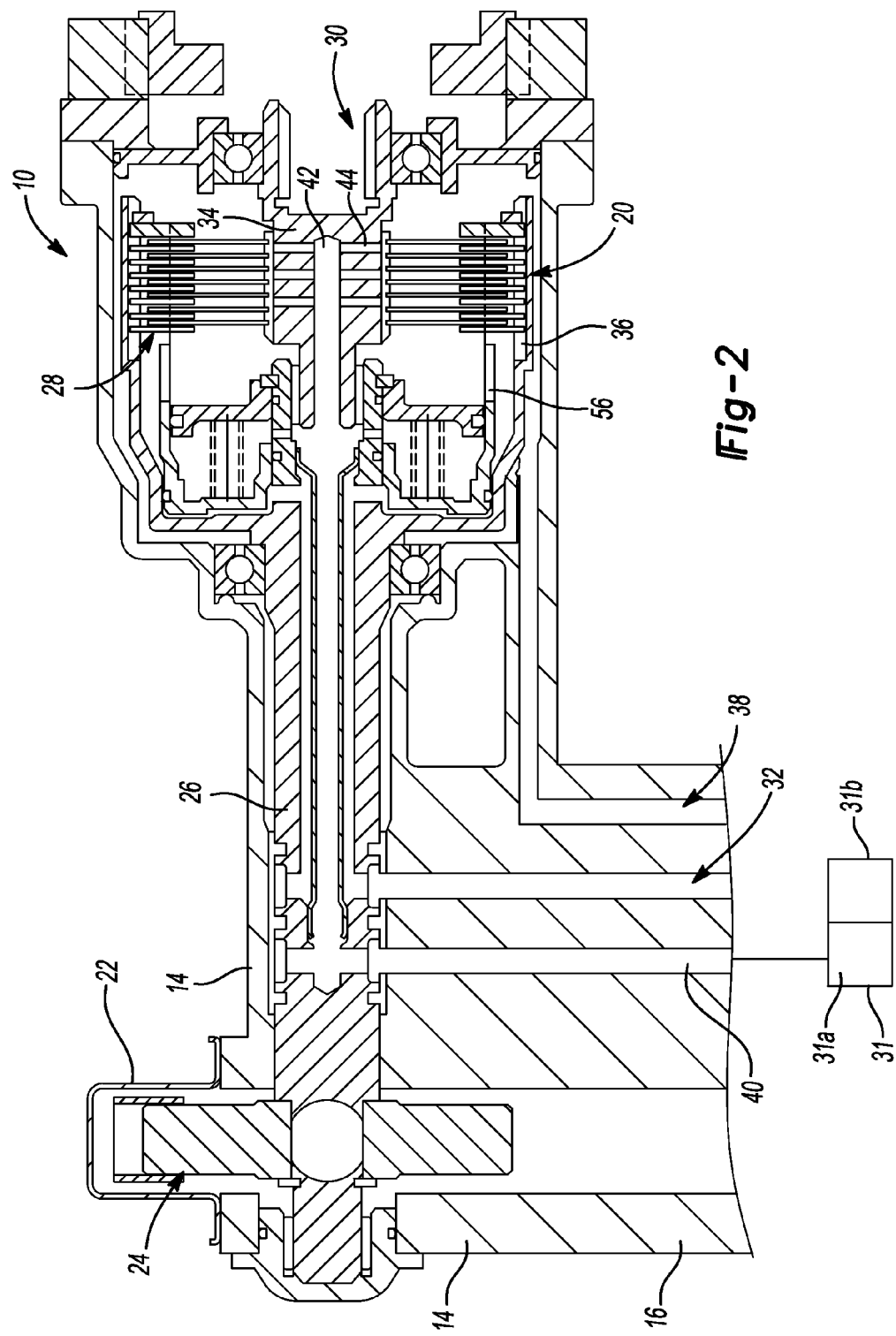
FIG. 2 is a diagrammatic cross sectional side elevational view of the transmission of FIG. 1.

Referring to FIG. 3, and again to FIGS. 1-2, in an exemplary configuration of the PTO system 10, the pressurized oil volume is separated for delivery by the pressurized engagement line 32 for operation of the PTO system 10, and by the controlled lube oil circuit 40 which supplies pressurized oil for lubrication of the components of the PTO system 10. According to several aspects, a first portion of the pressurized oil volume is supplied by the pressurized engagement line 32 to an engagement oil passage 46 created through a wall of the PTO housing 14, which is in fluid communication with an apply line passage 48 created through the PTO drive shaft 26. From the apply line passage 48, the pressurized oil then flows into a clutch feed chamber 50 defining a first portion of an elongated bore 51 created in the PTO drive shaft 26. From the clutch feed chamber 50, the pressurized oil then flows through a clutch feed passage 52 extending through the wall of the PTO drive shaft 26 located proximate to disconnect clutch assembly 28, where it acts on one or more of the apply pistons 54 as previously described.

The apply piston(s) 54 displace in a clutch engagement direction "A", contacting one or more clutch plates 56, which in turn frictionally engage a plurality of clutch friction plates 58. The clutch friction plates 58 are connected to the output shaft member 34, therefore when the clutch friction plates 58 are frictionally engaged to the clutch plates 56 the output shaft member 34 is co-rotated when the PTO drive shaft 26 is rotated. Biasing members such as springs displace the apply pistons to disengage the clutch plates 56 from the clutch friction plates 58 when the oil pressure is bled off.

A separator tube 60 longitudinally disposed in the longitudinal running bore 51 of the PTO drive shaft 26 separates the pressurized oil in the clutch feed chamber 50 from pressurized oil in a control lube oil chamber 62, which defines a second portion of the longitudinal bore 51 of the PTO drive shaft 26. The separator tube 60 includes a first bulbous end 61a that frictionally contacts an inner wall having a first inner diameter of the longitudinal running bore 51, and a second bulbous end 61b that contacts an inner wall having a second inner diameter larger than the first inner diameter of the longitudinal running bore 51, positioned proximate to the disconnect clutch assembly 28. The second bulbous end 61b therefore has a diameter larger than a diameter of the first bulbous end 61a. The first and second bulbous ends 61a, 61b together with the tubular body of the separator tube 60 provide fluid boundaries that separate the clutch feed chamber 50 from the control lube oil chamber 62.

The control lube oil chamber 62 is supplied with a second portion of the volume of pressurized oil via the controlled lube oil circuit 40 discussed in reference to FIG. 2, via a lube oil passage 64. Pressurized oil in the lube oil passage 64 is flow restricted using first and second lube oil orifices 66, 68 created in an isolation member 67 before entering one or more lube oil connecting passages 70, 70' created through a wall of the PTO drive shaft 26. The control lube oil chamber 62 is in fluid communication with the lube oil delivery passage 42. As previously noted, pressurized oil in the control lube oil chamber 62 is prevented from mixing with the pressurized oil in the clutch feed chamber 50 by the separator tube 60. This allows the pressurized engagement line 32 when selected to independently direct pressurized oil to the apply pistons 54 or for this pressure to be bled off allowing disengagement of the clutch members, while an independent, restricted flow of the pressurized oil is available using the controlled lube oil circuit 40 to continuously lubricate components such as the disconnect clutch assembly 28 and various bearings of the PTO system 10.

In addition to the multiple feed lube apertures 44, the output shaft member 34 can further include a first bearing lube aperture 72 which directs lube oil from the lube oil delivery passage 42 to a first ball bearing assembly 74 rotatably supporting the output shaft member 34. Similarly, the output shaft member 34 can further include a second bearing lube aperture 76 which directs lube oil from the lube oil delivery passage 42 to a second ball bearing assembly 78 which also rotatably supports the output shaft member 34. The output shaft member 34 can be connected, for example by spline gears, to an output member 80 such as an output drive shaft used to rotate a device such as a hydraulic pump, a motor generator, or the like (not shown). A line pressure supply 82 can be used to deliver oil to the lube oil passage 64.

Figure 3:
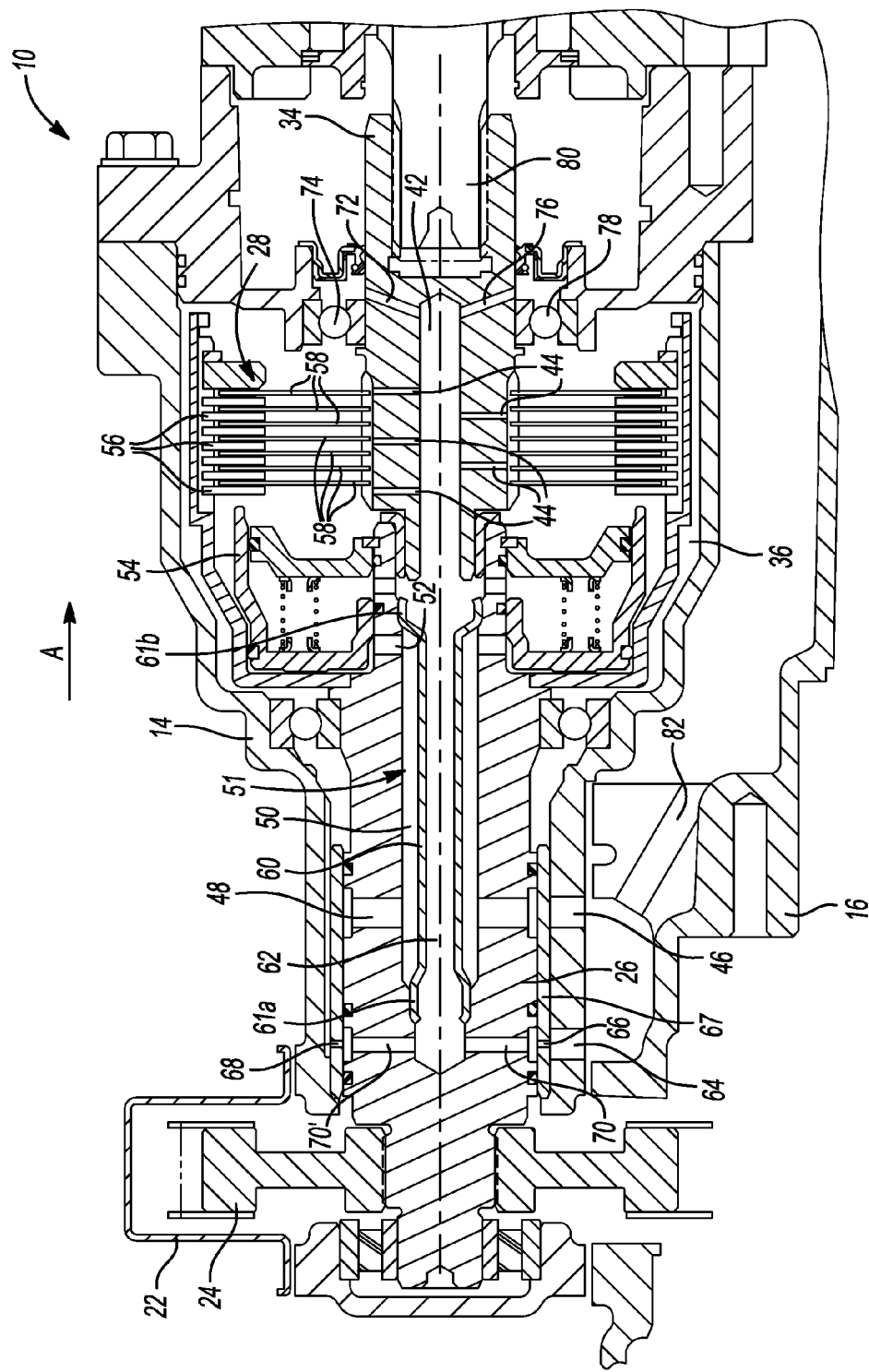
FIG. 3 is a cross sectional side elevational view taken at section 3 of FIG. 1.
Figure 4:
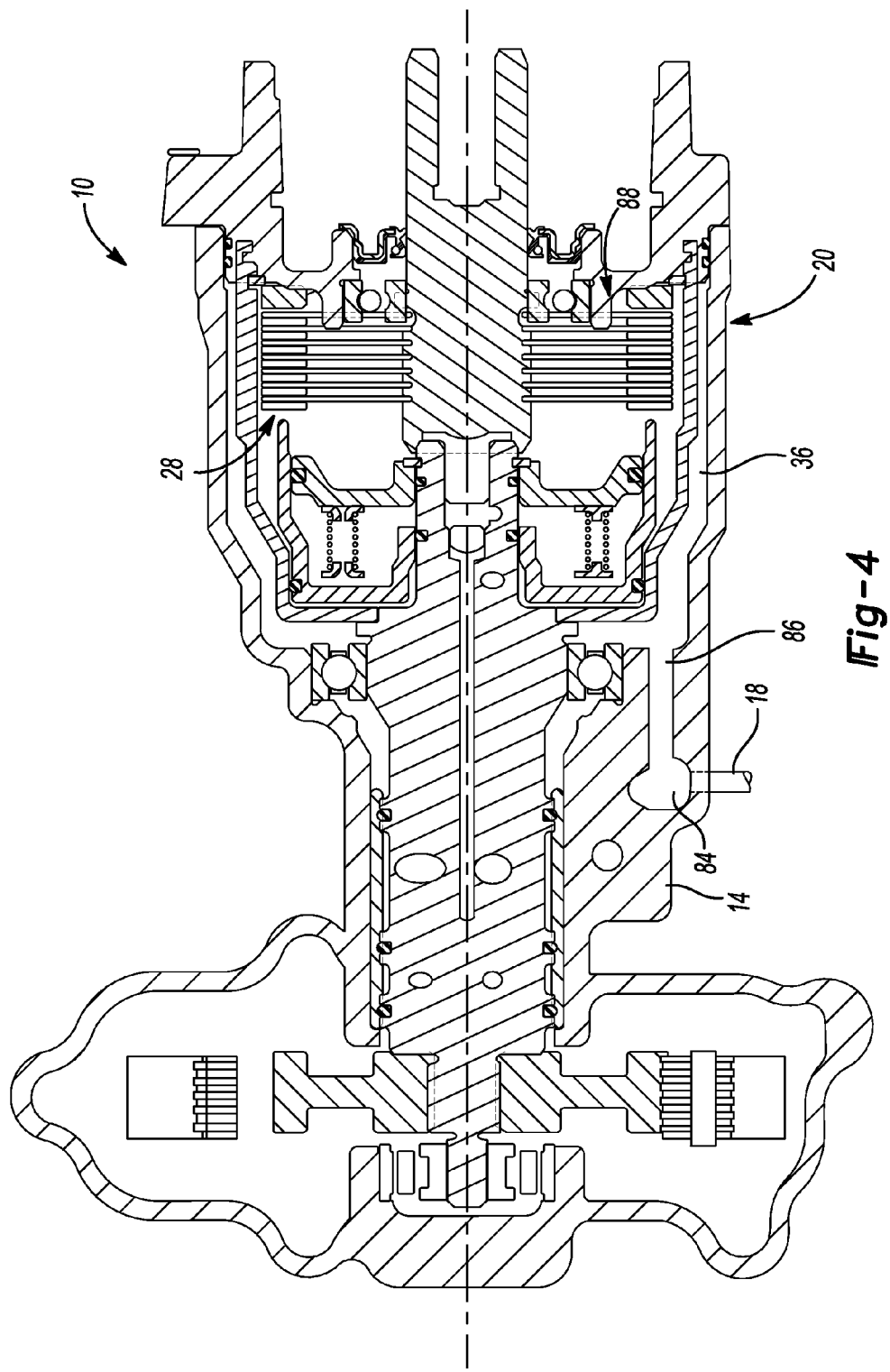
FIG. 4 is a cross sectional side elevational view modified from FIG. 3.
Figure 5:
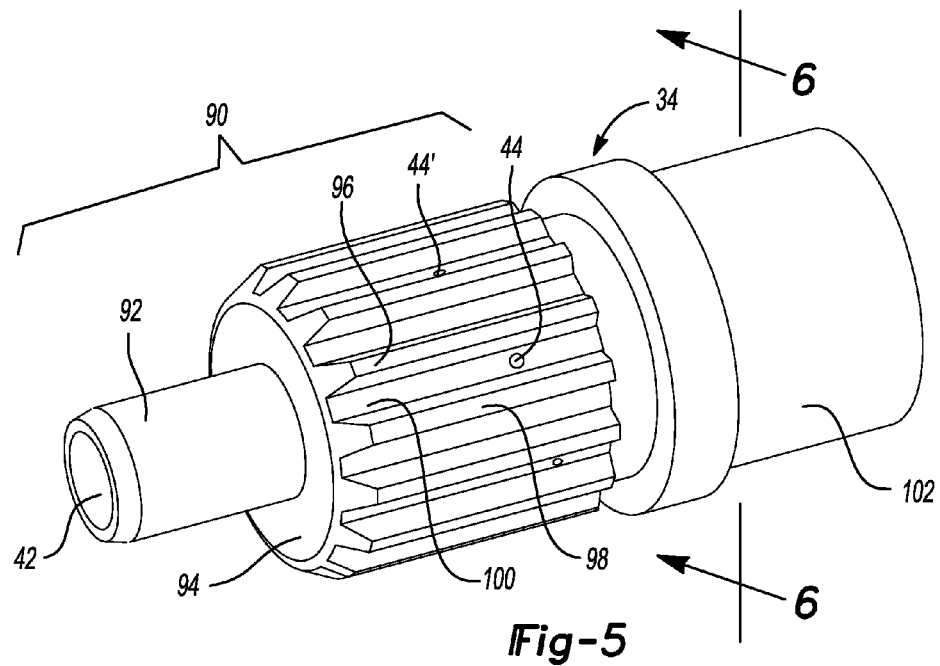
FIG. 5 is front left perspective view of an output shaft member according to aspects of the present disclosure.
Figure 6:
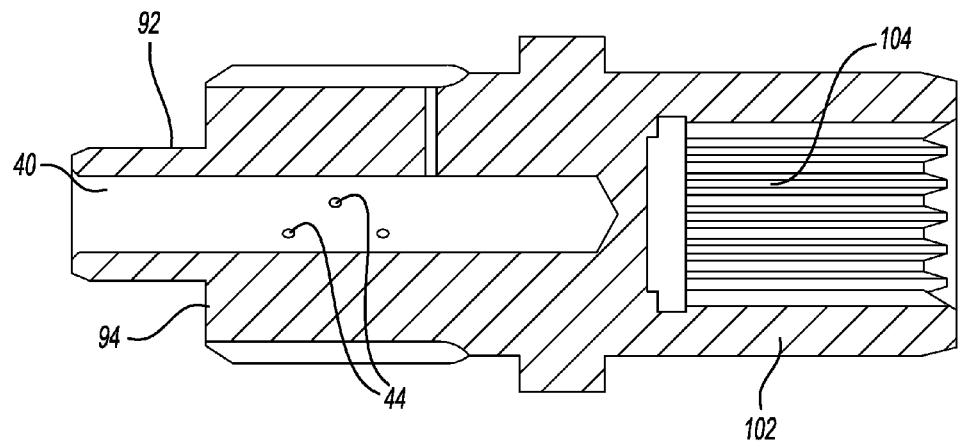
FIG. 6 is a cross sectional front left perspective view taken at section 6 of FIG. 5.

Referring to FIG. 4 and again to FIG. 3, the low point sump 36 is preferably positioned proximate to the housing low point 20. Depending on a geometry of the PTO housing 14, oil collected in the low point sump 36 can also be directed to a sump return chamber 84 via a sump chamber passage 86. The lube oil drain return 18, shown in greater detail in reference to FIG. 1, can be connected either directly to the low point sump 36, or to the sump return chamber 84. Pressurized oil provided as lubricating oil can also be supplied to and collected as drainage from a second or lower disconnect clutch assembly 88.

Referring to FIG. 5 and again to FIGS. 2 and 3, the output shaft member 34 can include a central passage portion 90 having the lube oil delivery passage 42 extending through both a nipple 92 and a geared portion 94 of the central passage portion 90. The lube oil delivery passage 43 can be created for example as a bored, closed-end chamber in the central passage portion 90. The geared portion 94 can be provided with external gear teeth such as a gear tooth 94 and a successive gear tooth 96, defining a spline gear. The feed lube apertures 44 are created for example by drilling into a valley 100 between any two successive gear teeth, such as between gear tooth 94 and the successive gear tooth 96, and into the lube oil delivery passage 42. Lubricating oil can therefore be delivered through the feed lube apertures 44 during rotation of the output shaft member 34 to the clutch members of the disconnect clutch assemblies. A drive end 102 of the output shaft member 34 which does not contain any of the feed lube apertures 44 or any portion of the lube oil delivery passage 42 can include a bore having internal gear teeth 104, defining a separate spline gear for engagement by the output member 80, shown and described in reference to FIG. 3.

The description of the invention is merely exemplary in nature and variations that do not depart from the gist of the invention are intended to be within the scope of the invention. Such variations are not to be regarded as a departure from the spirit and scope of the invention.

The following is claimed:

1. A power take-off (PTO) system for a motor vehicle, comprising:
   a PTO housing;
   a transmission case having a PTO pump and the PTO housing mounted to the transmission case;
   a disconnect clutch assembly positioned in the PTO housing; and
   a lube oil drain return connected to the PTO housing at a sump created at a housing low point, the lube oil drain return receiving oil that collects in the sump below the disconnect clutch assembly to be returned by gravity flow to the transmission case.

2. The power take-off system for a motor vehicle of claim 1, further comprising a PTO drive shaft positioned within the PTO housing, the PTO drive shaft connected to and axially rotated by a PTO input drive member positioned within the transmission case, wherein the disconnect clutch assembly is connected to the PTO drive shaft.

3. The power take-off system for a motor vehicle of claim 2, further including:
   a pressurized engagement line selectively supplying a first portion of a pressurized oil volume to an apply piston thereby displacing the apply piston to engage a plurality of friction plates of the disconnect clutch assembly; and
   a controlled lube oil circuit isolated from the pressurized engagement line supplying a second portion of the pressurized oil volume directly to the friction plates and the disconnect clutch assembly to continuously lubricate the friction plates and the disconnect clutch assembly.

4. The power take-off system for a motor vehicle of claim 3, further including a separator tube extending longitudinally within an elongated bore created in the PTO drive shaft, the separator tube defining and separating a clutch feed chamber and a control lube oil chamber, wherein:
the clutch feed chamber is connected to the pressurized engagement line acting to supply the pressurized oil from the pressurized engagement line to the apply piston; and
the control lube oil chamber is connected to the controlled lube oil circuit.

5. The power take-off system for a motor vehicle of claim 1, further including a controlled lube oil circuit supplying a pressurized oil volume directly to the disconnect clutch assembly to continuously lubricate the disconnect clutch assembly.

6. The power take-off system for a motor vehicle of claim 1, further comprising:
a PTO drive shaft positioned within the PTO housing, the PTO drive shaft having a longitudinal running bore; and
a separator tube longitudinally disposed in the longitudinal running bore separating pressurized oil in a clutch feed chamber from pressurized oil in a control lube oil chamber.

7. The power take-off system for a motor vehicle of claim 6, further including:
a pressurized engagement line supplying the pressurized oil in the clutch feed chamber from a first portion of a volume of pressurized oil of the transmission case; and
a controlled lube oil circuit supplying the pressurized oil in the control lube oil chamber from a second portion of the volume of pressurized oil of the transmission case.

8. The power take-off system for a motor vehicle of claim 6, further including:
an output shaft member rotatably connected to the PTO drive shaft; and
a lube oil delivery passage created in the output shaft member, the lube oil delivery passage in fluid communication with the control lube oil chamber.

9. The power take-off system for a motor vehicle of claim 8, wherein the output shaft member further includes multiple feed lube apertures in fluid communication with the lube oil delivery passage and opening at the disconnect clutch assembly to provide a continuous flow of pressurized oil to the disconnect clutch assembly.

10. The power take-off system for a motor vehicle of claim 8, wherein the output shaft member further includes a drive end having gear teeth for meshing with an output member.

11. The power take-off system for a motor vehicle of claim 1, wherein at least a portion of the lube oil drain return is positioned external to both the PTO housing and the transmission case.

12. A power take-off (PTO) system for a motor vehicle, comprising:
a PTO housing;
a transmission case having the PTO housing mounted to the transmission case;
a disconnect clutch assembly positioned within the PTO housing acting when supplied with a first volume of a pressurized oil from the transmission case to engage an output shaft member;
a controlled lube oil circuit isolated from the first volume of the pressurized oil, the controlled lube oil circuit supplying a second volume of the pressurized oil directly to the disconnect clutch assembly to lubricate the disconnect clutch assembly; and
a lube oil drain return connected to the PTO housing, the lube oil drain return receiving oil that collects inside the PTO housing to be returned to the transmission case.

13. The power take-off system for a motor vehicle of claim 12, wherein the lube oil drain return is connected to the PTO housing at a sump defining a housing low point.

14. The power take-off system for a motor vehicle of claim 13, wherein the lube oil drain return is pitched to permit gravity flow to the transmission case.

15. The power take-off system for a motor vehicle of claim 13, wherein at least a portion of the lube oil drain return is positioned external to both the PTO housing and the transmission case.

16. The power take-off system for a motor vehicle of claim 12, further including:
a PTO drive shaft positioned within the PTO housing;
an output shaft member rotatably connected to the PTO drive shaft;
the output shaft member having multiple feed lube apertures opening at the disconnect clutch assembly to provide a continuous flow of the pressurized oil to the disconnect clutch assembly from the second volume of the pressurized oil.

17. A power take-off (PTO) system for a motor vehicle, comprising:
a PTO pump connected to a PTO housing;
a transmission case having the PTO pump and the PTO housing mounted to the transmission case;
a lube oil drain return connected to the PTO housing at a sump located at a housing low point, the lube oil drain return allowing oil that collects inside the PTO housing to return by gravity flow to the transmission case;
a disconnect clutch assembly positioned within the PTO housing acting when supplied with pressurized oil to engage an output shaft member;
a controlled lube oil circuit isolated from the pressurized oil supplied to the disconnect clutch assembly, the controlled lube oil circuit supplying a second volume of the pressurized oil directly to the disconnect clutch assembly to lubricate the disconnect clutch assembly;
a PTO drive shaft positioned within the PTO housing, the PTO drive shaft having a longitudinal running bore; and
a separator tube longitudinally disposed in the longitudinal running bore separating pressurized oil in a clutch feed chamber supplied from the first volume of the pressurized oil from pressurized oil in a control lube oil chamber supplied from the controlled lube oil circuit.

18. The power take-off system for a motor vehicle of claim 17, further including a pressurized engagement line supplying the pressurized oil in the clutch feed chamber from a first portion of a volume of pressurized oil of the transmission case.

19. The power take-off system for a motor vehicle of claim 18, wherein the controlled lube oil circuit supplies the pressurized oil in the control lube oil chamber from a second portion of the volume of pressurized oil of the transmission case.

20. The power take-off system for a motor vehicle of claim 17, further including:
an output shaft member rotatably connected to the PTO drive shaft; and a lube oil delivery passage created in the output shaft member, the lube oil delivery passage in fluid communication with the control lube oil chamber.

\* \* \* \* \*